(12) United States Patent
Bailey et al.

(10) Patent No.: US 9,376,017 B2
(45) Date of Patent: Jun. 28, 2016

(54) METHOD AND APPARATUS FOR COMBATTING DISTRACTED DRIVING

(71) Applicant: Alcohol Countermeasure Systems (International) Inc., Toronto (CA)

(72) Inventors: Bruce A. Bailey, Sharon (CA); Steven H. Leach, Hamilton (CA)

(73) Assignee: Alcohol Countermeasure Systems (International) Inc., Toronto (CA)

( * ) Notice: Subject to any disclaimer, the term of this patent is extended or adjusted under 35 U.S.C. 154(b) by 0 days.

(21) Appl. No.: 14/489,638

(22) Filed: Sep. 18, 2014

(65) Prior Publication Data

US 2015/0084761 A1    Mar. 26, 2015

Related U.S. Application Data

(60) Provisional application No. 61/880,231, filed on Sep. 20, 2013.

(51) Int. Cl.
*B60Q 1/00* (2006.01)
*B60K 28/06* (2006.01)

(52) U.S. Cl.
CPC ..................................... *B60K 28/06* (2013.01)

(58) Field of Classification Search
CPC .... A61B 5/082; A61B 5/6898; G01N 33/497; G06Q 10/06; G07C 5/085; G07C 5/0891; H04K 2203/16; H04K 2203/22; H04K 3/415; H04K 3/42; H04K 3/43; H04M 1/03; H04M 1/21; H04M 1/6008; H04M 1/72569
USPC ......... 340/439, 575, 426.2, 426.11, 457, 518, 340/576, 5.82
See application file for complete search history.

(56) References Cited

U.S. PATENT DOCUMENTS

| | | | | |
|---|---|---|---|---|
| 2005/0269481 A1* | 12/2005 | David | ...................... | G01S 7/484 250/208.1 |
| 2006/0212195 A1* | 9/2006 | Veith | ...................... | G06Q 10/06 701/33.4 |
| 2009/0293589 A1* | 12/2009 | Freund | .................. | G07C 5/0891 73/23.3 |
| 2012/0286957 A1* | 11/2012 | Frechette | .................. | A61B 5/18 340/575 |
| 2013/0332004 A1* | 12/2013 | Gompert | .............. | G07C 5/0866 701/1 |
| 2014/0172467 A1* | 6/2014 | He | ........................ | B60K 28/066 705/4 |

* cited by examiner

*Primary Examiner* — Daniel Previl
(74) *Attorney, Agent, or Firm* — Lipsitz & McAllister, LLC

(57) ABSTRACT

The apparatus is for use with a motor vehicle operated by a driver and includes a scanning device and a computing facility. The scanning device, in use, gathers information about the eye activity of the driver. The computing facility determines, based on the information gathered, whether the driver is watching the road. The determination can include one or more of: ascertaining an orientation of at least one of the driver's eyes; and ascertaining an orientation of the head of the driver. The computing facility can be defined by a microprocessor. If the facility determines that the driver is not watching the road, the facility can trigger an alarm state of the vehicle. The apparatus can be employed for persons convicted of driving while texting in a manner analogous to the manner in which breath alcohol ignition interlocks are employed for persons convicted of driving under the influence of alcohol.

2 Claims, 1 Drawing Sheet

METHOD AND APPARATUS FOR COMBATTING DISTRACTED DRIVING

RELATED APPLICATIONS

This application claims the benefit of U.S. provisional patent application No. 61/880,231 filed on Sep. 20, 2013, which is incorporated herein and made a part hereof by reference in its entirety and for all purposes.

FIELD OF THE INVENTION

The invention relates to the field of road safety.

BACKGROUND OF THE INVENTION

It is well-known to secure a motor vehicle against operation by a person who has consumed alcohol by installing in said vehicle a breath alcohol tester. A typical arrangement involves an interlock between the breath tester and the starter motor, pursuant to which, the starter motor cannot be engaged until a satisfactory breath sample has been given. In some jurisdictions, a person convicted of driving under the influence of alcohol may be required by law to have a device of this type installed as a condition associated with the extension of driving privileges.

It is also well-known that conversing by text while driving has deleterious affects on road safety.

SUMMARY OF THE INVENTION

Forming one aspect of the invention is apparatus for use with a motor vehicle operated by a driver. The apparatus comprises: a scanning device which, in use, gathers information about the eye activity of the driver; and a computing facility which determines, based on the information gathered, whether the driver is watching the road.

According to another aspect of the invention, the determination can include one or more of: ascertaining an orientation of at least one of the driver's eyes; and ascertaining an orientation of the head of the driver.

According to another aspect of the invention, in the event that the facility determines that the driver is not watching the road, the facility can trigger an alarm state of the vehicle in which one or more of the following are actuated: lights carried by the vehicle; the horn of the vehicle; a siren carried by the vehicle; and an immobilizer circuit.

According to another aspect of the invention, actuation of the immobilizer circuit can activate a cellular signal blocker.

Advantages, features and characteristics of the invention will become apparent upon review of the detailed description and drawings, the latter being briefly described hereinafter.

DETAILED DESCRIPTION

Figure 1:
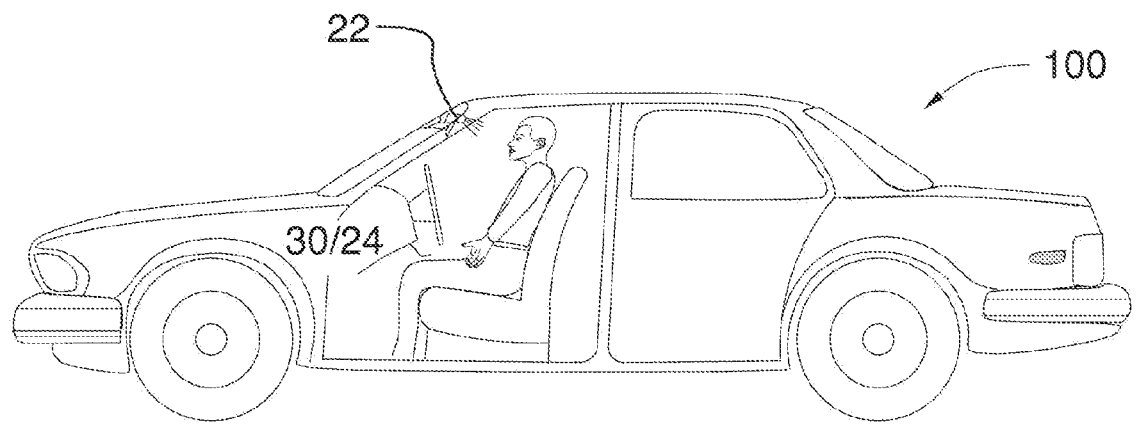
FIG. 1 is a side view showing apparatus according to an exemplary embodiment of the invention in use with a vehicle.
Figure 2:
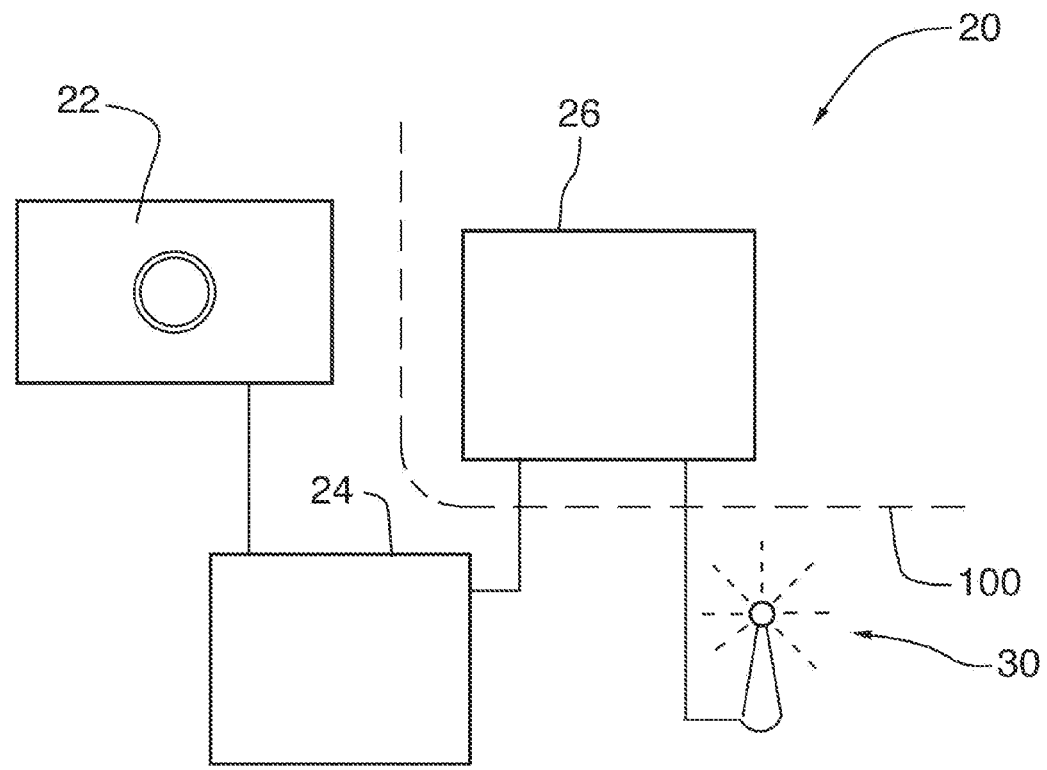
FIG. 2 is a schematic view of the apparatus of FIG. 1

With reference to FIG. 1 and FIG. 2, the exemplary embodiment 20 will be understood to include: a scanning device 22 in the form of a camera; a computing facility 24; and a cell phone blocker 30.

In use, the camera 22 is positioned relative to the vehicle 100 so as to capture images of the face of the operator of the vehicle. Persons of ordinary skill are familiar with the placement of cameras for this purpose and accordingly, further detail in this regard is neither required nor provided.

The computing facility 24 is multifunctional and in the exemplary embodiment is defined by a microprocessor.

In one functionality, the computing facility 24 determines, based on the information gathered from the camera, 22 that is, the images captured, whether the driver is watching the road.

In the exemplary embodiment, the determination involves the detection of the pupil of the driver in each image, if visible. Persons of ordinary skill are familiar with pupil detection using cameras, for example, for drowsiness alarm purposes, and accordingly, further detail in this regard is neither required nor provided.

In the exemplary embodiment, the frequency of image-taking and pupil-detecting over a predetermined period is such that, if a pupil is not identified in any image taken over the predetermined period, then there exists a statistical certainty that the eyes of the driver have been removed from the road for more than 4.6 seconds; on this basis, the exemplary facility concludes that that the driver is not watching the road. [The US government, in www.distraction.gov, concludes that a driver sending or reading a text takes his or her eyes off the road for 4.6 seconds.]

In this event, the facility 24 triggers an alarm state of the vehicle 100 in which an immobilizer circuit 26 is actuated; actuation of the immobilizer circuit 26 in turn activates a cell signal blocker 30 that, while the vehicle 100 is moving, blocks cell phone signals until such time as the vehicle has been motionless for five minutes. Persons of ordinary skill are familiar with statistics and accordingly, further detail regarding the length of the predetermined period and the number of images captured and analysed therein is neither required nor provided. With reference to FIG. 2, it will be evident that in the exemplary embodiment, the immobilizer circuit 26 forms part of the vehicle 100, and in this regard, it will be apparent to persons of ordinary skill that the circuitry associated with the onboard diagnostic system of the vehicle serves as an immobilizer circuit when suitable signals are fed by the facility 24 to the OBD port; accordingly, further detail is neither provided nor required.

It is contemplated that the inventive apparatus will be employed for persons convicted of driving while texting in a manner analogous to the manner in which breath alcohol ignition interlock devices are employed for persons convicted of driving under the influence of alcohol, i.e. the persons convicted of texting while driving will be required to install the inventive apparatus in their vehicles for at least a period of time as a condition attached to their driving privileges.

Thus, the exemplary embodiment will be understood to have many of the features commonly provided in the context of breath alcohol ignition interlock devices, including but not limited to:

secure data logging functionality, whereby details [time and date] of each alarm state are stored, for subsequent retrieval and delivery to, for example, probation officers or the DMV
 anti-tampering functionality
 facial recognition Further, whereas a specific embodiment is described, variations are possible.

For example, whereas a cell phone blocker is specifically contemplated, as this is illegal in some jurisdictions, the alarm state could result, for example, in actuation of one or more of: lights carried by the vehicle; the horn of the vehicle; a siren carried by the vehicle; and an immobilizer circuit which causes the vehicle to come to rest. Without intending to be bound by theory, it is believed that a low-power cell phone blocker is a desirable component of the system and, given that it is only actuated while the vehicle is in motion, is unlikely to create problematic interference with neighbouring uses.

As well, whereas the exemplary embodiment involves a rough determination of the orientation of the driver's eyes, by use of an assessment of pupil visibility relative to the fixed camera, other variations are possible. For example, the apparatus could ascertain an orientation of the head of the driver based upon biometric analysis of the facial features of the driver or upon stored information pertaining to the shape of the head of the driver.

Further, whereas in the exemplary embodiment, the immobilizer circuit is defined by the onboard diagnostics system under control of signals provided thereto by the processor 24, it will be evident that the immobilizer circuit could be defined as a component separate and apart from the vehicle.

Yet further, whereas the cell phone blocker is indicated to receive control signals from the immobilizer circuit, it will be appreciated that the cell phone blocker could be directly controlled by the processor 24.

Accordingly, the invention should be understood as limited only by the accompanying claims, purposively construed.

What is claimed is:

1. Apparatus for use with a motor vehicle operated by a driver on a road, the apparatus comprising:
- a scanning device which, in use, gathers information about eye activity of eyes of the driver; and
- a computing facility for determining, based on the information gathered, whether the driver is watching the road;

wherein:
- the determining comprises one or more of: ascertaining an orientation of at least one of the eyes of the driver; and ascertaining an orientation of a head of the driver; and
- in the event that the computing facility determines that the driver is not watching the road, the computing facility triggers an alarm state of the vehicle which actuates a cell signal blocker.

2. Apparatus according to claim 1, wherein, in the alarm state of the vehicle one or more of:
- lights carried by the vehicle;
- a horn of the vehicle;
- a siren carried by the vehicle; and
- an immobilizer circuit are also actuated.

\* \* \* \* \*